United States Patent [19]

Estabrooke

[11] 4,242,206

[45] Dec. 30, 1980

[54] FILTER DEHYDRATOR

[75] Inventor: John C. Estabrooke, Campbell, Calif.

[73] Assignee: Velcon Filters, Inc., San Jose, Calif.

[21] Appl. No.: 955,016

[22] Filed: Oct. 26, 1978

[51] Int. Cl.² .............................................. B01D 27/04
[52] U.S. Cl. .................................... 210/489; 210/502;
210/DIG. 10
[58] Field of Search ...................... 210/96 R, 101, 282,
210/323 T, 488–491, DIG. 10, 502

[56] References Cited

U.S. PATENT DOCUMENTS

| | | | |
|---|---|---|---|
| 3,252,270 | 5/1966 | Pall et al. | 210/502 X |
| 3,339,735 | 9/1967 | Kasten | 210/100 |
| 3,406,827 | 10/1968 | Topol et al. | 210/96 R |
| 3,528,546 | 9/1970 | McPherson | 210/96 R |
| 3,528,547 | 9/1970 | Adams et al. | 210/96 R |
| 3,572,510 | 3/1971 | Lyda | 210/502 |
| 3,589,364 | 6/1971 | Dean et al. | 128/284 |
| 4,124,116 | 11/1978 | McCabe | 210/502 |

Primary Examiner—John Adee
Attorney, Agent, or Firm—Limbach, Limbach & Sutton

[57] ABSTRACT

A filter dehydrator for sensing the presence of and separating free water in a transient flow of fluid is disclosed comprising an inlet for the fluid, and outlet for the fluid, a mass of water absorptive cellulosic fibers disposed between the inlet and the outlet and a filter medium means upstream of the absorptive mass for removing solid particles that would block the active surface of the mass and for dispersing water droplets in the fluid. The preferred water absorptive cellulosic fiber mass is a water-insoluble cross-linked carboxymethyl cellulose fiber and the preferred filter and disperser is a fiberglass medium filter.

5 Claims, 3 Drawing Figures

FILTER DEHYDRATOR

BACKGROUND OF INVENTION

The present invention relates in general to a fuel-water filter dehydrator and more particularly to such a filter dehydrator useful for removing free water from aviation fuel.

It is critically important that aviation fuel for today's high-performance aircraft engines be of high quality. Typical aircraft fueling systems include efficient filtration and water separation equipment. However, it is desirable that a system include means which will prevent unacceptable fuel from passing into the aircraft.

Many fuel water separator systems include some type of coalescer and filter separator elements which retain the solid contaminants contained in the fuel flowing through the system and are effective to coalesce and remove the water content therein. In removing the solid contaminants of the transient fuel, the elements gradually offer increased resistence to the flow of fuel until the attained pressure drop across the element becomes greater than the system pressure can attain. If the element is not replaced before this occurrence, the element will malfunction and discharge into the aircraft fuel tanks a large quantity of contaminants, both solid and water. Also, it has been found that in certain circumstances the fuel being passed through the fuel water separators may contain surfactants and the like, causing the coalescer elements to be inoperative or ineffective in coalescing and removing the water content of fuel.

As a result of the aforementioned problems, water sensitive flow monitors have been designed to block the flow of fuel containing an unacceptable concentration of free water therein. Military specification MIL-M-81380B(AS) dated Sept. 19, 1975 has even been written to specify the effectiveness of such flow monitors.

U.S. Pat. Nos. 3,528,546 to R. W. McPherson and 3,528,547 to R. E. Adams et al., both assigned to the assignee of the present invention, disclose water sensitive flow monitors containing respectively a granular bentonite material or an algin material provided in such a water sensitive flow monitor. U.S. Pat. No. 3,572,510 to S. J. Lyda discloses a monitor filter employing a polyethylene oxide between a fiberglass filter tube and a cellulosic fiber confining filter. It has been disclosed to include in a monitor of this general configuration a fail-safe mechanism which automatically shuts off the flow of liquid hydrocarbon fuel. U.S. Pat. No. 3,710,822 to S. J. Lyda discloses a shut-off valve inside the monitor of the construction of the above referenced Lyda patent. Lyda U.S. Pat. No. 3,710,822 also makes reference to other shut-off devices, such as a compressed coil spring held under tension by a strip of hydrophilic paper or a plastic ball acting in conjunction with an aluminum ring.

One such shut-off device is described in U.S. Pat. No. 3,406,827 to G. J. Topol et al. and is marketed by Keene Corporation under the name Petroguard. This product includes a fiberglass layer surrounding a phenol formaldehyde resin impregnated cellulosic material. The monitor element has a reduced thickness near the hydrophilic paper strip to allow passage of some water to trigger the unit as a fuse. Necessarily, at least some water must pass through the filter element into the outlet in order for the unit to operate as a fuse monitor.

It is the object of the present invention to provide a new improved filter dehydrator which will block the flow of fuel containing an unacceptable concentration of water therein and remove water from fuel.

Broadly stated, the present invention, to be described in greater detail below, is directed to a filter dehydrator for transient hydrocarbon fluid comprising an inlet and an outlet, a mass of water absorptive cellulosic fibers disposed between the inlet and the outlet and media disposed upstream of said water absorptive mass for removing solid particles that would block the active surface of the mass and disperse water droplets in the hydrocarbon fluid.

In accordance with a preferred embodiment of the present invention the water absorptive cellulosic fibers comprise a water-insoluble cross-linked carboxymethyl cellulose fiber. Such a material is described in U.S. Pat. No. 3,589,364 to W. L. Dean et al. which describes the method of manufacture of such material and the absorptive characteristics of the material. It is not certain whether such material has adsorptive qualities as well, so the term "absorptive" is used herein to mean the qualities of a material made as described in that patent.

A feature and advantage of the present invention lies in the fact that apparatus or elements constructed in accordance with this invention can serve the dual functions of a filter and a dehydrator. The elements can serve as both the primary filter, as well as a dehydrator in those instances where another filter system is unavailable and can serve as a dehydrator in situations where a conventional prior art type filter is already provided.

In accordance with another aspect of the present invention a fiberglass material serves as the media upstream of said water absorptive mass for both filtering solid particles that would block the active surface of the mass and disperse water droplets in the fluids. These two functions could be performed separately by other materials, but can be performed simultaneously by appropriate fiberglass.

It has been discovered that fiberglass with average fiber diameters of substantially 0.00005 inches and a density of substantially 10 pounds per cubic foot will perform both of these functions with water-insoluble cross-linked carboxymethyl cellulosic material in this filter dehydrator.

The foregoing and other objectives, features and advantages of the invention will be more readily understood upon consideration of the following detailed description of certain preferred embodiments of the invention, taken in conjunction with the accompanying drawings wherein the same reference number refers to the same or similar elements in each of the several views.

DESCRIPTION OF THE PREFERRED EMBODIMENT

While the present invention has application in a number of possible environments it is ideally suited as a fuel-water separator and filter for aviation fuel. Although this filter dehydrator can typically be used in conjuction with other conventional fuel-water separator systems, the device can be utilized as a single filter dehydrator unit to filter and remove water and solids from aviation fuel and shut off the flow of fuel before these contaminates exceed acceptable levels. Accordingly, the invention will be described in its preferred embodiment as a filter dehydrator for aviation fuel.

Figure 1:
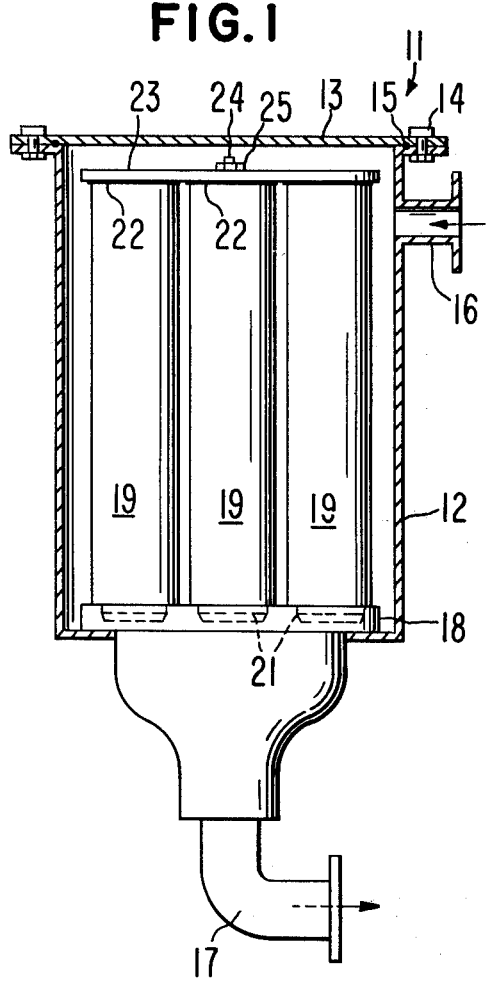
FIG. 1 is a schematic elevational view, partially in section, illustrating the present invention.

Referring now to the drawing with particular reference to FIG. 1, there is illustrated a filter dehydrator element or assembly 11 in the form of a container having a cup-shaped housing 12 provided with a lid or cover 13 sealably closing the top of the housing 12, such as by nut and bolt fastening means 14 between the cover 13 and housing 12 and compressing an O-ring 15 therebetween.

The housing 12 is provided with an inlet 16 and an outlet 17 and a manifold 18 is mounted in the bottom of housing 12 in communication with the outlet 17. The manifold 18 is provided with a plurality of openings each for receiving the open end of an elongate upstanding, hollow, cylindrical water sensitive filter dehydrator element 19 open at one end 21 and closed at the other end 22. Each element 19 is sealably engaged in the manifold aperture such as by a friction fit or O-ring seal and typically held in upstanding relation thereto by a support assembly which can include a top retainer plate 23 which is operatively connected to manifold 18 by an upstanding bolt 24 and an associated nut 25 and engages the closed end of the element 19. It will be apparent that access can be had to the interior of assembly 11 by removing the nut and bolt fastening means 14 and removing the cover 13 to expose the assembled elements 19. After removing nut 25 from upstanding bolt 24 the retainer plate 23 can be lifted from the assembly and one or more of the elements 19 removed, inspected and/or replaced in the manifold 18.

The direction of fluid flow through the assembly 11 is indicated by the arrows. Fluid enters through the inlet 16, passes radially inward through the elements 19 through the open end 21 into the manifold 18 and exits through the outlet 17.

Figure 2:
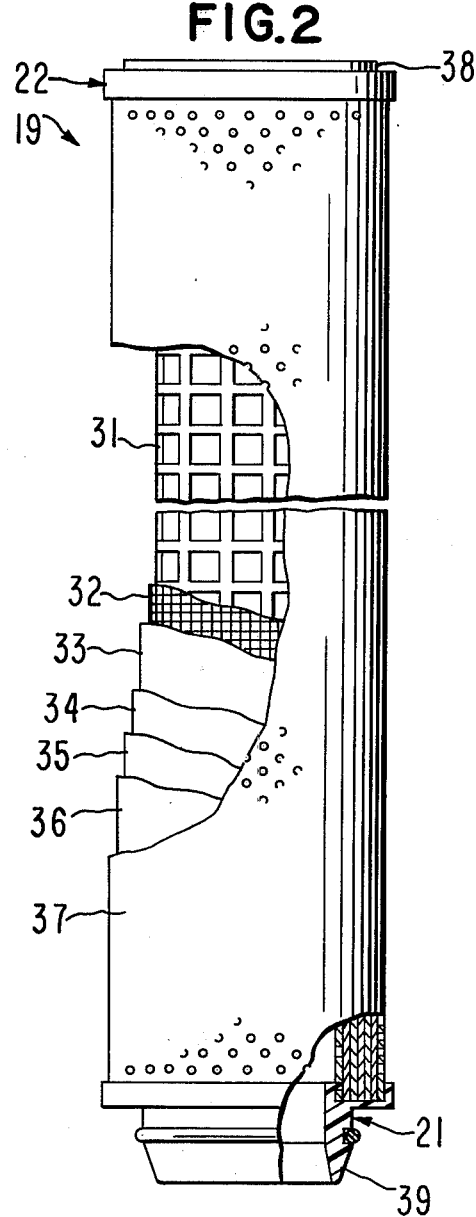
FIG. 2 is a schematic enlarged elevational view, partially in section and partially broken away, illustrating one of the filter dehydration elements shown in FIG. 1.

The filter dehydrator elements 19 have a structure as shown in FIG. 2. Each element includes layers of material which operate together to produce water separation and other particle contaminant filtering from aviation fuel to the point at which fuel flow is completely shut off by collected water and solids. The innermost layer is a perforated support tube or grid structure 31 surrounded by a water-absorptive-medium migration barrier which includes a retaining screen 32 and two layers of a filter paper 33. A water absorptive cellulosic fiber medium 34 is positioned around the filter paper 33 and is surrounded by a fiberglass filter medium 35. The filter medium 35 is in turn surrounded by a filter media retaining wrap 36 and an outer cover 37. These structural portions of element 19 are held in their wrapped condition by end caps 38 and 39.

As part of the present invention it was discovered that in combination with the other structural portions of the element 19 and particularly the fiberglass filter medium 35 water absorptive cellulosic fiber material 34 serves as an excellent water absorptive medium for jet aviation fuel. As mentioned above such water-insoluble wet cross-linked carboxymethyl cellulose fiber material is described in detail in Pat. No. 3,589,364 to W. L. Dean, et al. and assigned to the Buckeye Cellulose Corporation, Cincinnati, Ohio. Such materials are sold as CLD super absorbent filter by Buckeye. This material which is sold in powder, fiber or sheet material will absorb approximately 25 times its own weight of water and retain the same even at a centrifugal force of 1600 gravities. In the embodiment illustrated two wrapped layers of sheet material, each approximately 0.049 inches thick with a ream weight ($24 \times 36$) of 247 grams per square meter are wrapped over one another to avoid thin spots in the material.

It has been discovered that in the filter dehydrator in accordance with the present invention the rate of water takeup in the water absorptive medium 34 must be such that all free water is retained within the transit time of the fluid through the monitor. The rate at which water is retained is a function of the surface activity which is influenced by the ratio of water drop mass to surface area and the display and condition of the surface of the water absorptive medium. Accordingly a suitable medium or media upstream of the absorptive layer should remove all or substantially all solid materials that would block the active surface, emulsify or disperse the water droplets passing therethrough, and impede the release of water from its exiting surface. Fibers coated with a phenolic or similar resin with a surface energy such as of about 35 ergs/cm$^2$ commercially available as fiberglass, are capable of filtering out solids having a particle size of less than 1 micrometer by proper selection of fiber size and mass density. Further, this material by its surface activity, deters the release of water drops but permits their migration to the exit surface which is adjacent to the absorptive medium 34. The pore size, formed by appropriate selection of fiber size and control of mass density, emulsifies or disperses water droplets. The fiberglass filter medium 35 also provides a springlike expansion space for the water absorptive medium to enable absorbtion and collection of the large volume of water in the element 19 which the water absorptive medium 34 can hold.

In many prior art situations fiberglass has been used to coalesce water in a jet fuel filter-water-separator. The addition of resin aids in this coalescing action. In the present invention dispersion rather than coalescing of water droplets is desired.

The underlying water-absorptive-medium migration barrier can also serve to allow swelling of the water absorptive medium but must prevent migration of the water absorptive medium 34 which absorbs water to the point of becoming gelatinous. Consequently the filter paper 33 is selected to have a filter rating to prevent passage of the saturated cellulosic fiber medium 34. The retaining screen 32 keeps the filter paper 35 from breaking through the openings in the support grid 31 at high pressure differential.

The elements 19 are formed by wrapping the layers 32, 33, 34, 35, 36, and 37 around the support tube 31 and adding the end caps 38 and 39. The end caps 38 and 39 are formed by disposing the respective end of the wrapped assembly in a suitable die and adding in liquid form a suitable quick setting resin material such as a polyester resin which is inert to the fluid being treated.

As an illustrative preferred embodiment of the present invention the innermost tube or grid structure 31 is made of an ABS plastic sold by Crellin Plastics. The retaining screen 32 is a vinyl coated fiberglass insect screen 18×14 lines per square inch sold by Chicopee Manufacturing Co., and the filter paper 33 is two layers of resin impregnated paper stock having a porosity of approximately 75 micrometers. The water absorptive medium 34 is two layers of water-insoluble wet cross-linked sodium carboxymethyl cellulosic fiber sheet each 0.049 inches thick with the same ream weight given above. The fiberglass filter medium 35 is two wraps of Owens-Corning PF 105 one-half inch loft fiberglass compressed to a mass density of approximately 10 pounds per cubic foot. It has been found that in such an embodiment of this, fiberglass compressed to a density of approximately 6 pounds per cubic foot will not provide satisfactory dispersion of water droplets. The retaining wrap 36 is a scrim cloth sold by Chicopee Manufacturing Co. under designation SK 350-CM-3420, and the outer cover 37 is a perforated oil board sold by Latex Fibers Industries, Inc., VB-2331 Gray Filter Stock. All materials for the parts of element 19 are inert to the fluid being treated which in the case of the preferred embodiment is jet aviation fuel.

In operation, the fluid to be treated, such as JP-4 or JP-5 jet fuel or gasoline, is caused to enter the housing 12 through the inlet 16 and then caused to flow to the outlet 17 through the filter dehydrator elements 19. Fluid flow is from the outside to the inside of these elements 19 and then to outlet 17 through the manifold 18. The assembly 11 is disposed in fluid communication between a fuel supply and an aircraft to which clean dry fuel is to be delivered. It can be provided in fluid communication between a fuel-water separator unit and an aircraft. It will be appreciated that the assembly 11 can be stationary in nature, or can be mounted in a refueler vehicle and be an integral part of mobile refueling systems. During operation of such a system, the filter dehydrator elements 19 are inert to clean dry fuel containing no undesolved water. When traces or slugs of free water pass into the assembly 11, the elements 19 will absorb water and prevent passage of water into the outlet 17. The elements will sense water and/or solid particle contamination immediately by a build up of water in the water absorptive medium and/or solid particles in the filter medium, and for unacceptable levels of water and/or solid particles the elements 19 will register a practically instantaneous increase in pressure drop or a decrease in flow rate if the housing 12 is not provided with a differential pressure gauge. The pressure drop occurs between the water in the absorptive medium 34 and/or the solid particles in the filter medium 35 forms a composite mass cutting off the flow of fuel therethrough. The bursting strength of elements 19 is greater than the average system pressure output. Thus, the invention can provide a filtering function for aviation fuel as well as a dehydrating function which will permit acceptable fuel to pass, but once water contaminated fuel is present, the assembly completely blocks off any flow therethrough.

Figure 3:
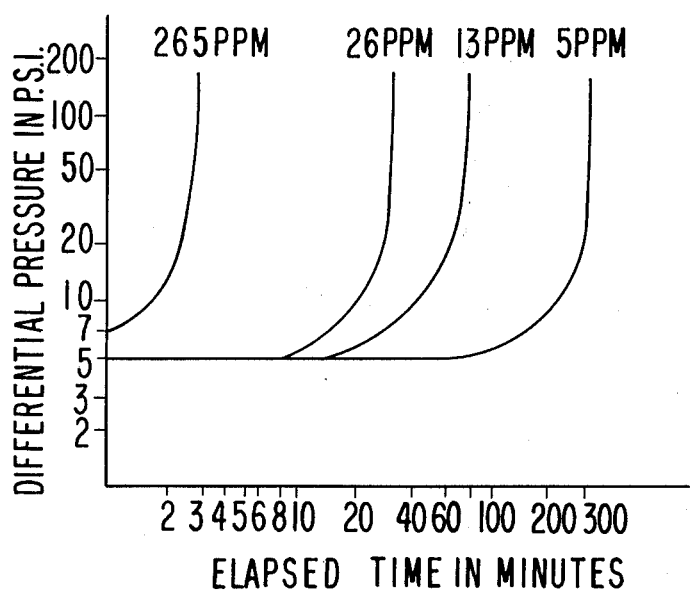
FIG. 3 is a graph of differential pressure plotted against elapsed time illustrating the characteristics of a filter dehydrator constructed in accordance with the present invention operating under several different levels of water contamination in aviation fuel.

FIG. 3 illustrates performance of elements 19 in accordance with this invention. As shown in the graph, flow of fuel with different levels of water contamination, such as 265, 26, 13, and 5 parts per million, takes place for a period of time until the amount of water collected in the element 19 produces a sufficiently high differential pressure across the element 19 to prevent any further flow of fuel. It has been found that jet fuel passed by the elements 19, even as pressure is building up thereacross, contains no measurable amount of water, ie less than 1 mg of water per liter of fuel.

Elements 19 having an inside diameter of one inch and an outside diameter of one and three-quarter inch have been constructed which have a flow rate of one gallon per minute per inch of length with a differential pressure not exceeding 8 psi. The elements do not meet the qualification of military specification MIL-M 81380B(AS) because they absorb far more water than the specification would permit before a required shut off operation. Elements thus constructed in accordance with this invention will absorb 17 ml of water per inch of length.

It is apparent that certain aspects of the present invention can be changed or modified without departure from the spirit of this invention as set forth in the appended claims.

As pointed out above the filtering and dispersing functions could be performed by separate layers and even by separate layers of different materials.

It has been discovered that elements 19 that have been placed in operation and have become saturated with water to block off flow of fuel can be removed from the housing 12 and dried out. After a drying operation wherein the absorbed water is removed, the element 19 can be put back into service and operate as a successful dehydrator.

I claim:

1. A filter dehydrator comprising:
    an element having an inlet for fluid to be filtered and an outlet for filtered fluid,
    a confined passageway establishing communication between said inlet and said outlet,
    a mass of water absorptive cellulosic fibers comprising a water-insoluble cross-linked carboxymethyl cellulose fiber medium disposed within said passage permitting the passage of hydrocarbon fluids therethrough while swelling upon the presence of free water to block the flow of fluid between said inlet and said outlet, and
    a fiberglass medium filter means disposed within said passage upstream of said water absorptive mass for removing substantially all solid particles that would block the active surface of said mass and for dispersing water droplets in the hydrocarbon fluid.

2. The filter dehydrator of claim 1 wherein said fiberglass medium filter means filters out solids having a particle size of greater than 2 micrometers.

3. The filter dehydrator of claim 1 wherein said fiberglass medium filter means comprises a fiberglass having an average fiber diameter of substantially 0.00005 inches and a density of substantially 10 pounds per cubic foot.

4. A filter dehydrator for use in a system for sensing the presence of separating water in a transient hydrocarbon fluid, the system including a vessel having a fluid inlet and a fluid outlet, the improvement comprising:
    a substantially water-insoluble cross-linked sodium carboxymethyl cellulose fiber medium,
    a filter medium means upstream of said absorptive medium for dispersing water droplets in the stream of hydrocarbon fluid and comprising a fiber glass medium having an average fiber diameter substantially 0.00005 inches and a density in the range of substantially 10 pounds per cubic foot, and
    a fiber medium retaining barrier means and a medium support structure downstream of said fiber medium.

5. The filter dehydrator of claim 4 wherein said fiber medium retaining barrier means comprises wraps of resin impregnated filter paper preventing passage of water soaked fibers of said fiber medium and a screen member downstream of said barrier means.